United States Patent [19]

Akutagawa et al.

[11] Patent Number: 5,077,325

[45] Date of Patent: Dec. 31, 1991

[54] PENETRABLE, EPOXY RESIN COMPOSITION COMPRISING GLYCIDYL ETHER OF BISPHENOL MODIFIED WITH GLYCOL OR URETHANE, AND INORGANIC FILLER

[75] Inventors: Ichiro Akutagawa, Nagareyama; Tsutomu Yamaguchi, Saitama; Kunimitsu Matsuzaki, Yono, all of Japan

[73] Assignee: Somar Corporation, Japan

[21] Appl. No.: 375,625

[22] Filed: Jul. 5, 1989

[30] Foreign Application Priority Data

Jul. 4, 1988 [JP] Japan ................. 63-166234

[51] Int. Cl.[5] ...................... C08K 3/00; C09J 163/02; C09J 163/04; C09J 163/00
[52] U.S. Cl. .................................. 523/428; 523/427
[58] Field of Search ............................. 523/427, 428

[56] References Cited

U.S. PATENT DOCUMENTS 3,897,455 7/1975 Sanjana ................................ 523/427
4,066,625 1/1978 Bolger ................................ 260/59 R
4,460,718 7/1984 Tanaka et al. ....................... 523/428
4,528,261 7/1985 Hauser ................................ 430/322
4,546,130 10/1985 Nishida ............................... 523/459
4,632,970 12/1986 Hiza et al. ........................... 525/460

FOREIGN PATENT DOCUMENTS

A164129 11/1982 European Pat. Off. .

Primary Examiner—Thurman K. Page
Assistant Examiner—Edward J. Webman
Attorney, Agent, or Firm—Lorusso & Loud

[57] ABSTRACT

A penetrable, epoxy resin composition is disclosed which comprises: a liquid, epoxy resin mixture containing a glycidyl ether of bisphenol having an epoxy equivalent of 158-270 and a flexible epoxy resin which is a glycidyl ether of a bisphenol modified with a glycol or a urethane; a curing agent capable of reacting with the epoxy resin mixture when heated to a curing temperature; an inert organic solvent which does not react with the epoxy resin mixture, which is capable of dissolving the curing agent and which has a boiling point lower than the curing temperature; and an inorganic filler having an average particle size of 0.1-5 μm.

9 Claims, No Drawings

PENETRABLE, EPOXY RESIN COMPOSITION COMPRISING GLYCIDYL ETHER OF BISPHENOL MODIFIED WITH GLYCOL OR URETHANE, AND INORGANIC FILLER

BACKGROUND OF THE INVENTION

This invention relates generally to an epoxy resin composition having excellent penetrability and, more specifically, to an epoxy resin composition suitable for use in bonding a ferrite magnet to a motor yoke. The present invention is also concerned with a method of permanently fixing a ferrite magnet to a motor yoke.

One pack-type liquid epoxy resin containing a liquid epoxy resin blended with an inorganic filler together with a latent curing agent is known and is used in various fields. In recent years, it has been proposed to use an adhesive for fixing a ferrite magnet to a motor yoke in lieu of fixation by bolting. For this purpose, the use of such a one pack-type liquid epoxy resin as mentioned above has been proposed. Known adhesives, however, have poor penetrability so that it is difficult to cause the adhesive to penetrate, with satisfactory fluidity, into a fine clearance between the surfaces of the yoke and the ferrite magnet. Thus, with the use of the conventional adhesive, it is necessary to apply the adhesive onto the surface of the yoke and/or ferrite magnet before assembly.

SUMMARY OF THE INVENTION

It is, therefore, an object of the present invention to provide an epoxy resin composition excellent in penetrability into fine gaps between articles to be bonded which are temporarily held together.

It is a special object of the present invention to provide a composition of the above-mentioned type which is suited for bonding a ferrite magnet to a motor yoke.

It is a further object of the present invention to provide a method for bonding a ferrite magnet to a motor yoke with the above epoxy resin composition.

In accomplishing the foregoing objects, there is provided in accordance with the present invention a penetrable, epoxy resin composition comprising:

a liquid, epoxy resin mixture containing a glycidyl ether of a bisphenol having an epoxy equivalent of 158-270 and a flexible epoxy resin;

a curing agent capable of reacting with said epoxy resin mixture when heated to a curing temperature;

an inert organic solvent which does not react with said epoxy resin mixture, which is capable of dissolving said curing agent and which has a boiling point lower than said curing temperature; and an inorganic filler having an average particle size of 0.1-5 μm, said composition having a viscosity of 50-10,000 cP at 25° C.

In another aspect, the present invention provides a method of fixing a ferrite magnet at a desired location on the surface of a motor yoke, comprising the steps of:

providing the above epoxy resin composition;

magnetically bonding the ferrite magnet to the motor yoke at the desired location, at least one of the magnet and the yoke being so shaped that a clearance or gap of 0.02-1 mm is defined therebetween;

positioning the resulting assembly to maintain the gap in a vertical or slanted position;

applying a quantity of the epoxy resin composition on an upper portion of the gap; and heating the assembly at the curing temperature, so that the epoxy resin composition penetrates into the gap and is cured within the gap with the simultaneous evaporation of the organic solvent.

Other objects, features and advantages of the present invention will become apparent from the detailed description of the invention to follow.

DETAILED DESCRIPTION OF THE INVENTION

In the present invention, two types of epoxy resins are used in combination. One of them is a glycidyl ether of bisphenol having an epoxy equivalent of 158-270, preferably 175-270. By the term "epoxy equivalent" is meant "weight per epoxy" which is a weight (g) of the epoxy resin providing 1 g equivalent of the epoxy group. Illustrative of suitable glycidyl ethers of bisphenol are bisphenol A, bisphenol F and bisphenol AD epoxy resins. These glycidyl ethers may be used by themselves or as a mixture of two or more.

The other type of the epoxy resin which is to be used in combination with the above glycidyl ether of bisphenol is a flexible resin, preferably one obtained by modifying the above glycidyl ethers with a glycol or an urethane. Examples of the glycol-modified, glycidyl ether resins include the compounds having the following general formula:

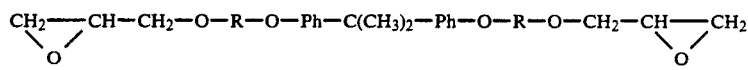

wherein R stands for $-CH_2CH_2-OCH_2CH_2-_n$, $-CH_2CH_2CH_2-OCH_2CH_2CH_2-_n$ or $-CH_2CH_2CH_2CH_2-OCH_2CH_2CH_2CH_2-_n$ where n is a positive interger, and Ph stands for p-phenylene.

Examples of the urethane-modified, glycidyl ether resins include the compounds having the following general formulas:

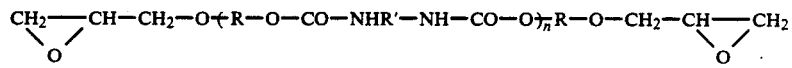

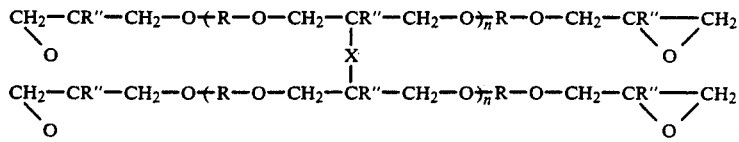

wherein R stands for an alkykene, o-, m- or p-phenylene, o-, m- or p-phthaloyl, —Ph—CH$_2$—Ph—, —Ph—C(CH$_3$)$_2$—Ph—, —Ph—CHCH$_3$—Ph— or —CH$_2$CH$_2$O—$_m$ where Ph is p-phenylene and m is a positive integer, R' stands for p-phenylene, alkylene or —Ph—CH$_2$—Ph—$_m$ where Ph and m are as defined above, R" stands for hydrogen or methyl, X stands for —O—CO—NH —R'—NH—CO—O— and n is a positive integer.

The glycidyl ether of bisphenol is preferably used in an amount of 95-50% by weight, while the flexible epoxy resin is used in an amount of 5-50% by weight.

The curing agent to be used in the present invention is preferably a latent curing agent which does not react with the mixed epoxy resin at room temperature but can react therewith at a temperature of 60° C. or more, preferably 100° C. or more. As such a curing agent, there may be preferably used a nitrogen-containing, latent curing agent, such as dicyanodiamide, a guanamine, e.g. acetoguanamine and benzoguanamine, a hydrazide, e.g. adipodihydrazide, stearodihydrazide, isophthalodihydrazide and sebacohydrazide, or a triazine compound, e.g. 2,4-dihydrazide-6-methylamino-S-triazine. Especially preferred is the use of dicyanodiamide. The latent curing agent is preferably used in an amount of 0.03-2.0 moles per 1 equivalent of the epoxy group of the mixed epoxy resins.

It is preferred that a curing accelerator be used in conjunction with the above curing agent. Such a promoter may be, for example, 3-substituted-1,1-dimethylureas, imidazole derivatives and solid solution of 1,8-diaza-bicyclo(5,4,0)undecene-7 and phenol novolak. Examples of suitable urea compounds are 3-(3,4-dichlorophenyl)-1,1-dimethylurea, 3-(p-chlorophenyl)-1,1-dimethylurea, 3-phenyl-1,1-dimethylurea, N,N'-(4-methyl-1,3-phenylene)-bis(N,N'-dimethylurea) and 5-(N,N'-dimethylureido)-1-(N",N"-dimethylureidomethyl)-1,3,3-trimethylcyclohexane. The curing accelerator is suitably used in an amount of 1-30 parts per 100 parts of the mixed epoxy resin.

An inorganic filler is incorporated into the composition of the present invention. Illustrative of the inorganic fillers are silica, alumina, titania, calcium carbonate, talc, clay, calcium silicate, mica, glass fibers, glass powder, glass flakes and whiskers of various kinds. The amount of the inorganic filler is 1-400 parts by weight, preferably 10-300 parts by weight per 100 parts by weight of the mixed epoxy resins. The inorganic filler should have an average particle size of 0.1-5 μm. Too large a particle size is disadvantageous because the penetrability of the resulting composition becomes poor.

In the present invention a thixotropic agent, preferably having an average particle size of 100 nm or less is preferably used. Examples of such a thixotropic agent include super-fine silica and alumina, aluminum hydroxide, fibrous magnesium oxysulfate, powdery asbesto, fibrous silica, fibrous potassium titanate, scale-like mica, and a montmorillonite-organic salt composite referred to as bentonite. The thixotropic agent is used in an amount of 0.1-30 parts by weight, preferably 0.5-15 parts by weight per 100 parts by weight of the epoxy resin.

An organic solvent is incorporated into the composition of the present invention in such an amount as to maintain the viscosity thereof in the range of 50,10,000 cP at 25° C. The organic solvent serves not merely as a diluent but also as a solvent for the curing agent. It is a common practice to incorporate a reactive diluent such as 1,6-hexanediol diglycidylether into epoxy resin compositions so as to lower the viscosity thereof. It has been found, however, that such a reactive diluent causes precipitation of the curing agent so that the composition fails to show suitable penetrability and homogeneity. As a consequence, a cured body obtained from such a composition becomes poor in bonding strength and heat resistance. It is also important that the organic solvent be evaporated and removed from the cured mass during its curing stage, since otherwise tight bonding between articles to be bonded cannot be accomplished.

The organic solvent preferably has a boiling point of 40°-220° C., more preferably 60°-160° C. Examples of such organic solvents include methanol, N,N-dimethylformamide, 2-ethoxyethanol, dimethyl sulfoxide, ethylene glycol monomethyl ether, ethylene glycol monoethyl ether and ethylene glycol dialkyl ethers. Of these, the use of methanol, N,N-dimethylformamide, ethylene glycol monomethyl ether or ethylene glycol monoethyl ether is especially preferred.

The organic solvent is used in an amount so that the composition has a viscosity (25° C.) of 50-10,000 cP, preferably 500-5,000 cP. The amount of the organic solvent is generally 2-50 parts, preferably 5-30 parts by weight per 100 parts by weight of the mixed epoxy resin.

The composition according to the present invention may further contain, as desired, a reactive diluent, a flame retarder, a coupling agent, a leveling agent, a lubricating agent, an ooze-preventing agent, a sedimentation-preventing agent, a dispersing agent, an adhesion-imparting agent, a wetting agent or a pigment. Examples of the reactive diluent include a polyoxyalkylene glycol glycidyl ether, phenoxyether monoepoxide, 1,6-hexanediol diglycidyl ether, phenyl glycidyl ether and 2-ethylhexyl glycidyl ether.

Because of the incorporation of an organic solvent, the epoxy resin composition of the present invention has excellent penetrability and is especially suited for use as an adhesive for bonding a ferrite magnet to a motor yoke.

In bonding a ferrite magnet to a motor yoke with the composition of the present invention, the ferrite magnet is first attached at a desired position to the motor yoke by utilizing its magnetic force so that a gap of 0.02-1 mm is defined therebetween. Then, a predetermined quantity of the composition is applied by, for example, dropping from a dispenser, onto an upper portion of the gap between the motor yoke and the ferrite magnet. All that is subsequently needed is to place the resulting assembly in an oven. Because of the excellent penetrability of the composition of the present invention, it swiftly flows down into the gap between the motor yoke and the ferrite magnet. The composition is then cured with the simultaneous vaporization of the organic solvent. The heating temperature in the oven is generally 100°-220° C., preferably 150°-180° C. and the heating time is 5-120 minutes, preferably 15-60 minutes. In this manner, the ferrite magnet can be tightly bonded to the motor yoke by a simple operation.

The cured mass obtained from the epoxy resin composition according to the present invention contains substantially no organic solvent and is excellent in adhesion and strength. Further, the use of the mixed epoxy resin can give a cured resin which is excellent in bending strength and thermal expansion/shrinkage properties and does not cause cracking.

The following examples will further illustrate the present invention, wherein "part" is by weight. The test methods employed in the examples are as follows:

(1) Gellation time: In accordance with JIS C 2105, a test sample (0.4 cc) is placed on a hot plate at 150° C. The period of time required for the sample to gel is measured.

(2) Under shear adhesive strength: In accordance with JIS K 6850, a test sample is applied to one longitudinal margin (width of 10 mm) of a steel plate having a length of 100 mm, a width of 25 mm and a thickness of 1.6 mm, on which another steel plate having the same size is superimposed. After heating at 180° C. for 30 minutes, the bonded plates are measured for their adhesive strength under shear.

(3) Glass transition point: A test sample is cured at 120° C. for 1 hour and thereafter at 180° C. for 30 minutes to obtain a cured resin plate with a thickness of about 3 mm. The plate was cut to form a rectangular rod of about $3 \times 4 \times 20$ mm size. The rod is subjected to thermal mechanical analysis (TMA) with a heating rate of 5° C./minute. The point of inflection in the resulting thermal expansion curve represents the glass transition point of the sample.

EXAMPLE 1

A liquid epoxy resin composition containing 70 parts of a glycidyl ether of bisphenol A (Epikote 828, manufactured by Yuka-Shell Epoxy Inc.), 30 parts of a flexible epoxy resin (urethane-modified epoxy resin EPU-6, manufactured by Asahi Denka Inc.), 2 parts of a curing accelerator (3-(p-chlorophenyl)-1,1-dimethylurea), 0.25 part of colloidal silica, 20 parts of titanium oxide, 0.5 part of 2-methylimidazole-triazine and 28 parts of a solution obtained by dissolving 8 parts of dicyanodiamide in 20 parts of N,N-dimethylformamide (DMF) was prepared. This composition had a viscosity (25° C.) of about 1,200 cP, a gellation time of 200 seconds, an under shear adhesive strength (after curing) of 180 kg/cm² and a glass transition point (after curing) of 120° C. 2-Methylimidazoletriazine is a compound having the formula:

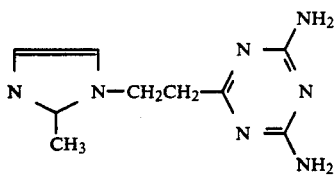

A given amount (about 0.5 g) of the above composition was placed on an upper portion of a gap of about 0.1 mm between a motor yoke and a ferrite magnet bonded to the yoke by the magnetic force thereof. Then the assembly was placed and heated in an oven at 180° C. for 30 minutes for curing. As a result, it was confirmed that the composition flowed down into the gap and cured. The ferrite magnet was found to be tightly bonded to the motor yoke with the cured resin. The cured resin was found to be substantially free of N,N-dimethylformamide.

EXAMPLE 2

Example 1 was repeated in the same manner as described except that the curing accelerator was used in an amount of 2.5 parts and that the 2-imidazole-triazine was not used. The composition had a viscosity (25° C.) of about 1,200 cP, a gellation time of 210 seconds, an under shear adhesive strength (after curing) of 185 kg/cm² and a glass transition point (after curing) of 120° C. With this composition, a ferrite magnet was bonded to a motor yoke in a manner similar to that in Example 1. Tight bonding was obtained.

COMPARATIVE EXAMPLE 1

A liquid epoxy resin composition containing 70 parts of a glycidyl ether of bisphenol A (Epikote 828, manufactured by Yuka-Shell Epoxy Inc.), 30 parts of a flexible epoxy resin (urethane-modified epoxy resin EPU-6, manufactured by Asahi Denka Inc.), 2.6 parts of a curing accelerator (3-(p-chlorophenyl)-1,1-dimethylurea), 0.25 part of colloidal silica, 20 parts of titanium oxide, 10 parts of dicyanodiamide and 30 parts of a reactive diluent (phenyl glycidyl ether) was prepared. This composition had a viscosity (25° C.) of about 1,300 cP, a gellation time of 280 seconds, an under shear adhesive strength (after curing) of 100 kg/cm² and a glass transition point (after curing) of 85° C. The curing agent was found to precipitate when the composition was allowed to stand at 25° C. for 4 hours.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

What is claimed is:

1. A penetrable, epoxy resin composition comprising:
   a liquid, epoxy resin mixture containing (1) a glycidyl ether of bisphenol having an epoxy equivalent of 158-270 and (2) a glycidyl ether of a bisphenol modified with a glycol or an urethane;
   a curing agent capable of reacting with said epoxy resin mixture when heated to a curing temperature;
   an inert organic solvent which does not react with said epoxy resin mixture, which is capable of dissolving said curing agent and which has a boiling point lower than said curing temperature; and
   an inorganic filler having an average particle size of 0.1-5 μm, said composition having a viscosity of 50-10,000 cP at 25° C.

2. A composition as claimed in claim 1, wherein said epoxy resin mixture is composed of 50-95 parts by weight of glycidyl ether of bisphenol A, bisphenol F or bisphenol AD and 5-50 parts by weight of an urethane-modified, glycidyl ether of bisphenol A, bisphenol F or bisphenol AD.

3. A composition as claimed in claim 1, wherein said organic solvent has a boiling point of 40°-220° C.

4. A composition as claimed in claim 1, wherein said organic solvent is at least one member selected from the group consisting of methanol, N,N-dimethylformamide, 2-ethoxyethanol, dimethyl sulfoxide, ethylene glycol monomethyl ether, ethylene glycol monoethyl ether and ethylene glycol dialkyl ethers.

5. A composition as claimed in claim 1, wherein said curing agent is at least one member selected from dicyanodiamide, guanamines, hydrazides and triazines.

6. A composition as claimed in claim 1, wherein said curing agent is dicyanodiamide and said organic solvent is selected from the group consisting of methanol, N,N- dimethylformaide, ethylene glycol monomethyl ether and ethylene glycol monoethyl ether.

7. A composition as claimed in claim 1, further comprising a thixotropy imparting substance.

8. A composition as claimed in claim 1, further comprising a curing accelerator selected from the group consisting of 3-substituted-1,1-dimethylureas, imidazole derivatives and solid solution of 1,8-diazabicyclo(5,4,0)undecene-7 and a phenol novolak.

9. A composition in accordance with claim 1 having a viscosity of 500–5,000 cP.

* * * * *

UNITED STATES PATENT AND TRADEMARK OFFICE
CERTIFICATE OF CORRECTION

PATENT NO. : 5,077,325

DATED : December 31, 1991

INVENTOR(S) : AKUTAGAWA et al

It is certified that error appears in the above-identified patent and that said Letters Patent is hereby corrected as shown below:

Col. 2, line 50, "$-CH_2CH_2-OCH_2CH_2-_n$" should read -- $-CH_2CH_2-(-OCH_2CH_2-)-_n$ --;

line 51, "$-CH_2CH_2CH_2-OCH_2CH_2CH_2-_n$" should read -- $-CH_2CH_2CH_2-(-OCH_2CH_2CH_2-)-_n$ --; and line 52, "$-CH_2CH_2CH_2CH_2-OCH_2CH_2CH_2CH_2-_n$" should read -- $-CH_2CH_2CH_2CH_2-(-OCH_2CH_2CH_2CH_2-)-_n$ --.

Col. 3, line 4, "$-CH_2CH_2O-_n$" should read -- $-(-CH_2CH_2O-)-_n$ --;

UNITED STATES PATENT AND TRADEMARK OFFICE
CERTIFICATE OF CORRECTION

PATENT NO. : 5,077,325
DATED : December 31, 1991
INVENTOR(S) : AKUTAGAWA et al

It is certified that error appears in the above-identified patent and that said Letters Patent is hereby corrected as shown below:

line 6, "—Ph—$CH_2$—Ph—$_n$" should read

-- $-(-Ph-CH_2-Ph-)_n$;

Signed and Sealed this

Sixth Day of July, 1993

*Attest:*

MICHAEL K. KIRK

*Attesting Officer*   Acting Commissioner of Patents and Trademarks